United States Patent [19]

Hirzel

[11] Patent Number: 5,322,657
[45] Date of Patent: Jun. 21, 1994

[54] METHOD OF FORMING AND SHAPING METALLIC MATERIAL

[75] Inventor: Theodor Hirzel, Widen, Switzerland

[73] Assignee: Unipor AG, Winterthur, Switzerland

[21] Appl. No.: 783,968

[22] Filed: Oct. 29, 1991

[30] Foreign Application Priority Data

Nov. 15, 1990 [CH] Switzerland .............. 03635/90-0

[51] Int. Cl.⁵ .................................... B29C 43/00
[52] U.S. Cl. .................... 264/115; 264/117; 264/125; 419/2; 428/402
[58] Field of Search ........... 264/115, 117, 125, 126, 264/41, 42, 69, 119, 118; 419/2; 428/402, 403

[56] References Cited

U.S. PATENT DOCUMENTS

| | | | |
|---|---|---|---|
| 3,755,213 | 8/1973 | Kendall et al. | 264/DIG. 50 |
| 4,455,187 | 6/1984 | von Blucher et al. | 427/286 |
| 4,765,950 | 8/1988 | Johnson | 419/2 |
| 4,889,833 | 12/1989 | Nakamura et al. | 501/1 |
| 5,000,780 | 3/1991 | Tokunaga | 75/246 |
| 5,021,213 | 6/1991 | Nishio et al. | 264/125 |
| 5,061,427 | 10/1991 | Hirzel | 264/219 |
| 5,063,011 | 11/1991 | Rutz et al. | 264/126 |

FOREIGN PATENT DOCUMENTS

| | | |
|---|---|---|
| 0329511 | 8/1989 | European Pat. Off. |
| 1113629 | 5/1968 | United Kingdom |
| 1442836 | 7/1976 | United Kingdom |
| WO88/07921 | 10/1988 | World Int. Prop. O. |

*Primary Examiner*—Robert A. Dawson
*Attorney, Agent, or Firm*—Nikaido Marmelstein Murray & Oram

[57] ABSTRACT

The process for producing a hard, shapable material with channels for the passage of fluids and which can be reduced in size at their exit points on the surface and which material has a desired bulk density, can be produced in that a cluster of several particles is formed from particles with the aid of a binder and said cluster is brought into the form of a cohesive structure with the aid of a binder in a further working step and the structure has a plurality of interconnected cavities. The porosity of the surface is reduced by breaking down surface clusters into fragments and embedding them in surface openings.

8 Claims, 1 Drawing Sheet

METHOD OF FORMING AND SHAPING METALLIC MATERIAL

BACKGROUND OF THE INVENTION

The invention is in the field of powder metallurgical materials and relates to an open-pore metal-based material, as well as to a process for its production.

Known porous, i.e. open-pore, metallic materials are sintered materials. They are produced in accordance with powder metallurgical guidelines and methods and in particular are characterized by a randomly adjustable porosity. For high strength components the pore space proportion is e.g. up to 5% and in the case of filters e.g. up to 60% of the total volume. Production essentially comprises three sections, namely powder production, shaping and sintering, optionally with a subsequent treatment. Each production step suffers from its own problems and the resulting part is generally a semifinished or finished part. The starting material is a metal powder, which is converted into a compact body.

SUMMARY OF THE INVENTION

Such materials must undergo metal working and are less suitable as a starting material for the production of finished parts, e.g. moulds and the like. It would be advantageous to have a material with characteristics of a sintered product, i.e. metallic and porous, but which can be processed e.g. like wood, or can be worked e.g. sawed or ground without becoming hot, as is the case with metals, cut which can still be polished in the same way as a metal. Thus, the requirement is to combine the advantages of powder metallurgical and woodworking processing and products, without having to accept their disadvantages. Such a material is made possible by the present invention.

The original idea is based on the fact that metal powder parts are bonded together instead of being welded together. Such a method is disclosed by WO 88/07 921 of the same inventor, which discloses shaped bodies for the deep drawing of foils and the casting of materials. The production of these shaped bodies takes place from injected metal powder, which is mixed with a binder, so that ideally each granule is coated with a thin binder film. The details are discussed in the aforementioned document. This process for producing a shaped body from a porous material is, in material-related manner covered by the present invention.

The metal powder must have particles with a very irregular shape. Spherical particles are less suitable, although they can be subject to the same process and also give usable results. Instead of coating the individual particles with a binder, so as to then shape them by bonding to give a compact body, a preproduct is produced from the granular material and this has granular material clusters produced in planned manner. Cluster formation takes place by a kneading and rubbing process, such as is carried out by bakers with dough.

The drawing and folding of the moist material leads to a strong mixing of the granular material and the connecting means. However, this mixing process is controlled in such a way that a granular product is obtained, which contains e.g. 3 to 5 starting particles, in this case metal particles.

DETAILED DESCRIPTION OF THE INVENTION

Figure 1A:
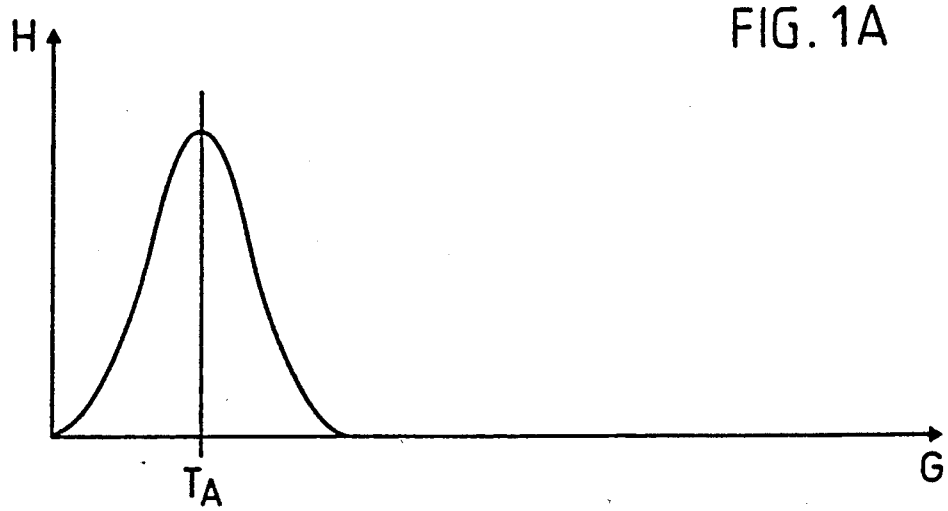
FIGS. 1A and 1B show the starting product (FIG. 1A) and the production of the granular product by means of distribution curves, in which the frequency H is plotted on the abscissa and the particles size G on the ordinate.
Figure 1B:
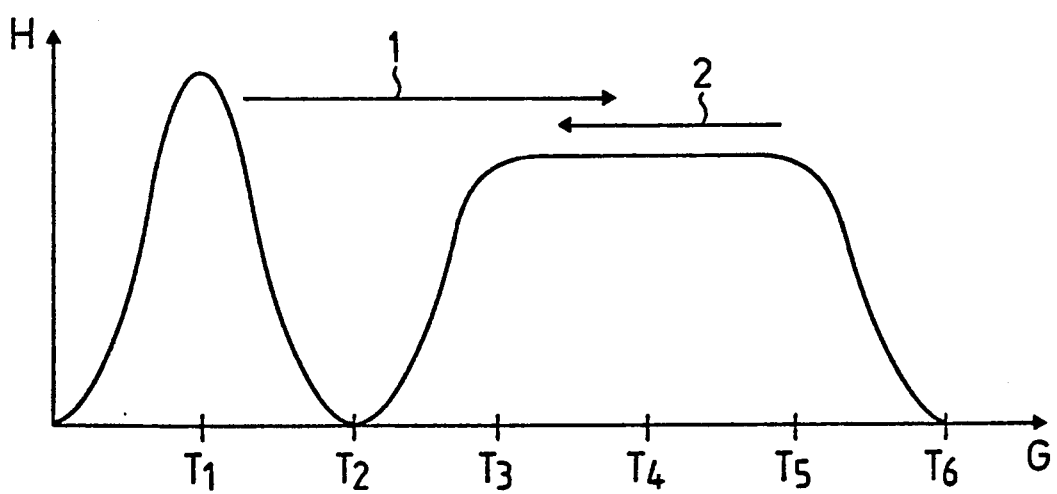

A specific metal particle screen fraction $T_A$ serves as the starting material (distribution curve 1A). FIG. 1B shows the same or a similar starting product formed from monomeric particles of size $T_1$. The said particles are combined by the specific mixing process by drawing and folding to form clusters of several, e.g. 2, 3, 4, 5 and 6 metal particles (cluster sizes $T_1$ to $T_6$—arrow 1), the cluster size being reduced by lengthening the mixing or kneading process (arrow 2). FIG. 1B shows an exemplified size distribution of the resulting clusters, which e.g. mainly comprise 3, 4 or 5 monomeric particles and which form a specific preproduct.

The preproduct, i.e. a cluster granular material is produced in the following way. Injected metal powder, preferably produced by an injection process leading to particles with irregular shapes and with respect to which preference is given to aluminium, is fed into a mixing machine. The latter must be suitable for kneading in such a way that there is a constant drawing and folding of the material therein. This is e.g. constituted by an apparatus with kneading arms and with a doctor blade moving relative to the container inner wall, so that the doughy material is forced between the container wall and the blade. At this point, which is a type of bottleneck, the material is compressed and drawn and with the kneading arms subsequently folded and this process is repeated until the desired material state is obtained, i.e. in this case the sought cluster size. A quantity of fluid resin corresponding to the starting quantity of the metal (e.g. 70 g of Al to 30 g of resin) is added portionwise and accompanied by constant mixing and the mixture is worked until after about 20 minutes a lumpy granular material has been obtained from the doughy material. In this way a cluster of approximately 4 to 8 monoparticles is obtained. If it is stopped earlier the cluster is larger, whereas the cluster becomes smaller if mixing and kneading are continued. However, a smaller cluster gives a lumpy granular material, but this can be more strongly compressed during sintering and the porosity decreases.

The thus produced cluster granular material is the preliminary stage for producing the finished product, which from the manufacturing standpoint is not an end product, but an intermediate. It is an intermediate because, after shaping, preferably readily processable plates, such as a piece of wood or metal, can be processed to an end product. Thus, this material becomes a material for the end products.

In order to give the said material its basic shape, the cluster granular material undergoes a sintering process. This takes place by adding a hardening or curing agent, e.g. by mixing and subsequent pressing, shaking, vibrating, etc. under pressure and heat supply, followed by the cooling of the shaped piece. The individual clusters are joined together in this process so as to give a completely irregularly structured material, which in the desired packing density also has irregular cavities in the same way as the clusters are irregularly brought together, sintered and hardened. On its surface the material has a plurality of irregularly shaped pores or openings, which correspond to the boundaries of the clusters and which in the same way as a poorly matching mosaic have irregularly shaped gaps. In cross-section these gaps or openings are extended to cavity-like passages, which are propagated in random shape and direction in the material and also have cross-connections of the same type. This leads to a solid, loose, foamy material and its "looseness" can be controlled by the production process.

A further important property of this material is the specific property through n-clusters, which can be fragmented on the surface. The surface can be worked in different ways and consequently has different characteristics. If the material e.g. undergoes sawing, the basic porosity is maintained to a greater extent than when the material is subsequently ground or even polished. The openings of the passages increasingly close with the grinding process. The finer the surface the finer the connection between the individual clusters and they appear to match together better through the working, which is surprising. If the surface of the material is subsequently polished, then a network of gaps between irregular boundaries cover the entire surface, these gaps being so fine that they can scarcely be recognized as an opening. Only at a few points where the working has torn whole clusters out of the surface, is it possible to see under a microscope the relatively coarse, skeletal structuring.

This surface fining does not result from a compression of the material, but through a type of filling of openings by removed material, i.e. by the working process, in which the structural clusters or the clusters bringing about the coarse structure are broken down into subunits, namely the original metal granular material. This fine granular material which only forms during working, forms the gap filling material with which the surface is made finer and namely up to the particle sizes of the granular material. In the substrate the skeletal coarse structure is maintained as a supporting structure. This supporting, coarse structure is sufficiently mechanically strong to serve as a material and the surface forms a coating having the planned characteristics.

Thus, in short, a fine-grain starting material is to be brought into the desired coarse structure, which as a supporting, space-filling skeleton has a minimum specific gravity and also a coarse structure (because only through the coarsening can the air-solid volume relation be brought about), which is then brought on its surface to the desired fineness, in which the starting clusters, which also supply the material or a fine structure, are broken down and incorporated.

The material is not heat-conducting, because the metal particles are not in a sufficient reciprocal contact for heat bridge formation, so that the heat resulting from surface working is used in situ namely for the purpose of embedding and baking the monoparticles in the resin structure. The surface structure is always irregular, because the monoparticles have irregular shapes, but corresponding to the n-cluster can be up to n-times finer.

If the coarse-structure material is worked with cutting means, which are not able to break down the cluster, e.g. a saw, then the coarse structure is maintained on the surface and in the interior. If cutting means are used, which can break down the cluster, e.g. a grinding wheel, then an ever finer structure is obtained, which finally becomes as fine as is allowed by the monoparticles and this is achieved by polishing.

If the original granular material was directly used instead of producing clusters, then following the sintering process the material would be much denser and heavier, namely in precisely the same way as would occur in a conventional sintering process. However, the larger a starting cluster, the more foamy and lighter the material obtained. However, this naturally has its limits. At some time the structural skeleton becomes too loose in order to give a hold. As the skeleton expands irregularly in all directions in space, roughly the same resistance occurs during each loading, i.e. the skeleton has an optimum isotropic character. This is one of the reasons for the good compression strength with low specific gravity. If a finer, more uniform surface is required, e.g. because a specific filtering action is to be obtained, then the surface clusters are broken down by means of a suitable tool and the fragments are incorporated into the openings. Baking takes place locally by the heat formed during the working process. However, the material cannot absorb too much working heat, so that most of this heat is conveyed away by the tool.

Such a material is light and gas-permeable, can be machined dry, i.e. without cooling due to the non-conducting properties and can be made finer and is still loose as a result of the cluster structure. As stated, the looseness can be controlled by the size of the clusters, which also defines the fining band width. A cluster of ten gives a fining band width of 1:10, from a relatively clearly visible coarse surface to a metallically bright polished surface. The gas permeability is consequently controlled without the specific gravity being impaired, which is not always the case with conventional sintered articles. This gas permeability control for the same specific volumetric density is one of the most important advantages compared with conventionally produced sintered materials.

Thus, if the problem is to produce a gas-permeable material with a low specific gravity and whose gas permeability is to be controlled without influencing the specific gravity, e.g. a "porosity" in a band width of 1:7 and having the same specific volume, this is solved in the following way. A basic material (monoparticle) is chosen, which corresponds to the finest porosity. This basic material is brought by a working process into clusters of several basic material particles. The cluster size determines the bulk density of the material. The clusters are baked together in a sintering process to a material, in such a way that the aimed at bulk density is obtained (shaking, vibrating, pressing, or all together). The finished material undergoes surface treatment, in that the surface clusters are broken down by a selected working process (sawing, grinding, polishing) and the fragments are incorporated in surface openings, so that the porosity is made finer. The incorporation takes place through pressure formed during working and the working heat which occurs bakes the cluster fragments into the resin matrix. As the material is not heat conductive, the excess heat is dissipated by the working tool. The surface abrasion and breaking down of the cluster take place successively. During polishing only monoparticles are incorporated into the surface openings and the porosity reaches its fineness limit.

The production of the clusters constitutes one working step and leads to a storable preproduct. The production of a starting material using the cluster preproduct constitutes a working step, which also leads to a storable semifinished product. The production of the finished product from the material and the introduction of the desired porosity forms a final working step, which is performed by the material user. The material gives him the possibility of carrying out this final working step in a correspondingly successful manner.

The starting product is a fine granular material, e.g. a metal material, which by connecting means is brought together to form a cluster of e.g. 4 to 10 particles, i.e. monoparticles. The cluster formation, which can be controlled, advantageously takes place by a kneading and rubbing process. The resin holding together the clusters contains little curing agent, because no mechanical strength is required. During further processing the cluster material is mixed with a resin curing agent and as a moist mass is compressed and heated in a mould. This essentially constitutes a sintering process, which leads to a semifinished article with a specific bulk density. This material can then be worked e.g. in the same way as wood. The bulk density is not modified by the subsequent working, although the pore fineness of the surface structure can be modified if desired. The term "pore" only applies in a wider sense.

EXAMPLE 7 kg of comminuted aluminium with particle sizes between 50 and 100 $\mu$m (screen fraction) is processed as a starting material with 3 kg of epoxy resin (Ciba-Geigy) as a binder or matrix to give a cluster of approximately 4 to 8 aluminium particles. The mixing time, kneading and folding at room temperature is 20 minutes. The resulting lumpy moist granular material can be stored and can be kept separately from the curing agent to be subsequently introduced. In order to obtain a material with a bulk density of approximately 1.7 g/cm$^2$, the 10 kg of moist granular material produced are mixed with 1 kg of curing agent (corresponding to the resin used) and the mixture (cluster granular material) is compressed or vibrated under a contact pressure of 120 kg/cm$^2$ and after-annealed at 100° C. The cured material is unworked, metallic coloured and has a matt surface. After grinding a metallic lustre becomes visible and after polishing the surface reflects in the same way as metal and the structure has become substantially monoparticle fine. The bulk density has naturally remained the same. If air is pressed into this material, then small bubbles of escaping air appear on its surface and which are very fine in the case of a polished surface. Like the bulk density, the material strength is still the same.

Aluminium-based material is produced from this pre-product with a cluster size T$_{4-8}$ and has roughly the following technical data:

| | |
|---|---|
| density | 1.5 to 1.7 g/cm$^2$ |
| Shore hardness D (according to DIN 53505) | 76.3 to 76.5 |
| abrasion (according to ASTM D 1044–78) | 195 to 220 mg |
| air permeability at 1 bar/cm$^2$ | 0.210 to 0.0289 1/min |
| pore size (vibrated material) | 12 to 25 $\mu$m |
| pore size (compressed material) | 6 to 12 $\mu$m |
| capillary volume | 16 to 21% |
| thermostability (with permanent heat application) | 95 to 100° C. |
| tensile strength (according to DIN 53455) | 12 to 21 Mpa |
| flexural tensile strength (according to DIN 53452) | 20 to 38 Mpa |
| impact strength (DIN 53433) | 17.3 to 24.5 mJ/mm$^2$ |
| compression strength | 80,000 to 100,000 N |

A composite material of this type can be worked in the same way as wood and/or metal. The pore size of 6 to 12 to 25 $\mu$ (as a function of the production process) is uniformly distributed over the entire material volume and the pores are interlinked. In the case of a resin proportion of only 30% the density of 1.7 g/cm$^3$ is extremely low (the density of aluminium is 2.7 g/cm$^3$). The material can be sawed, cut, polished, bonded, etc. and can be used for many different purposes. It can be readily offered for sale in the form of plates of different thicknesses or in beam-like pieces for further processing purposes.

The process for producing a hard, shapable material with channels for the passage of fluids which can undergo a size reduction at their exit points on the surface and which material has a desired bulk density involves a cluster of several particles formed with the aid of a binder and said cluster is brought together in a further working step with the aid of a binder so as to form a cohesive structure, having a plurality of interconnected cavities. The porosity of the surface is reduced by breaking down surface clusters into fragments and embedding the latter in surface openings.

The resulting material is characterized in that it has a coarse structure formed from particle clusters, which are held together by a binder. The particle cluster accumulations are binder-connected particles. As a result of a random working of its surface for making the porosity finer, the material has a surface, which is made finer and more compressed due to cluster fragments.

The inventive material can be used for producing shaped articles, models, filters, distributors for distributing gases or liquids, mixers for mixing gases and/or liquids, storing means, fire/noise protection coverings, etc.

I claim:

1. Process for producing a hard, shapable material having channels for the passage of fluids, the size of said channels being reduceable at their exit points on the surface of said material and in which said material has a desired bulk density, comprising forming clusters of particles held together by a first binding agent and shaping said clusters into a cohesive structure with the aid of a second binding agent to form said material, said material containing a plurality of interconnected cavities.

2. Process according to claim 1, wherein the clusters are produced by mixing said particles and said first binding agent and subsequent kneading.

3. Process according to claim 2, wherein the size of the clusters is regulated by the duration of said kneading.

4. Process according to any one of the claims 1 to 3, wherein said cohesive structure is produced by shaking, pressing or vibrating the clusters or by performing a combination of two or three treatments selected from the group consisting of shaking, pressing and vibrating.

5. Process according to claim 4, wherein the pore size of the material is adjusted by the choice of the process for producing the cohesive structure from the clusters and by the choice of the corresponding process parameters.

6. Process for reducing the size of surface openings in the material according to claim 1, comprising breaking down clusters at a surface of said material into fragments and embedding said fragments in channels at said surface.

7. A process as recited in claim 1, wherein said first binding agent is a resin and said second binding agent is a curing agent for said resin.

8. A method comprising shaping material into a protective covering, said material being produced according to the process of any one of claims 1 to 3, said material having a coarse structure formed from said clusters.

* * * * *